A. W. KEMMLING.
AUTOMOBILE LOCK.
APPLICATION FILED AUG. 19, 1919.
1,350,316.
Patented Aug. 24, 1920.
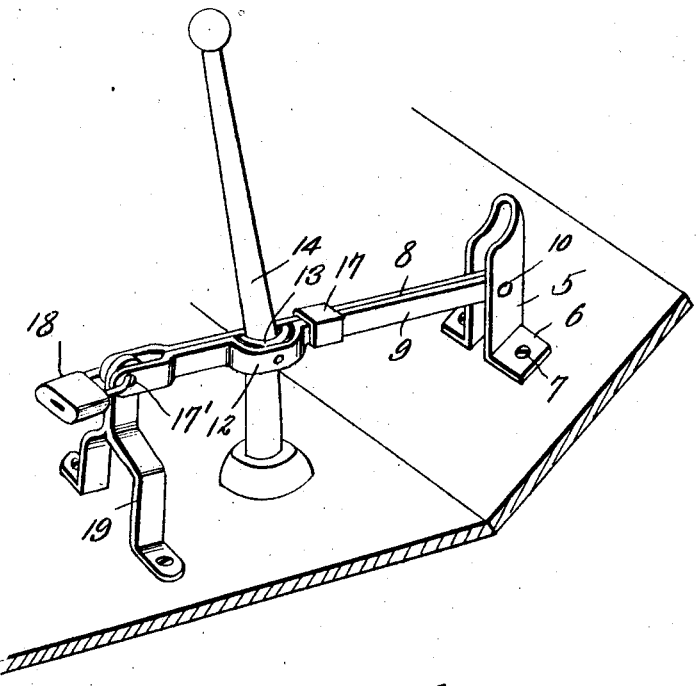
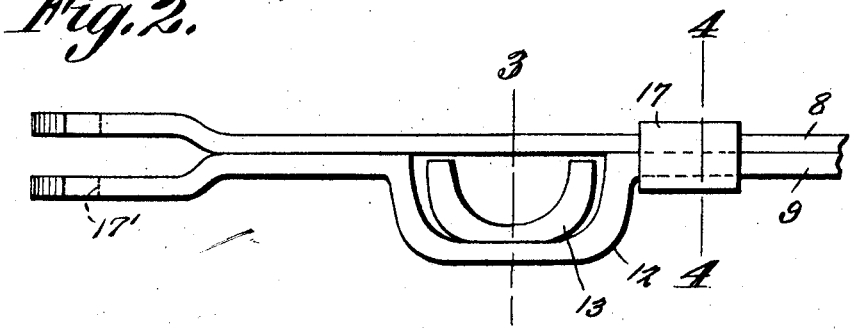
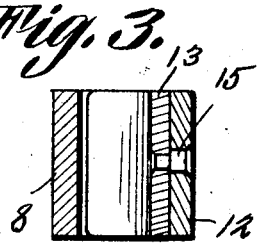
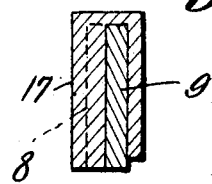
INVENTOR.
August W. Kemmling.
BY
*[signature]*
ATTORNEY.

UNITED STATES PATENT OFFICE.

AUGUST W. KEMMLING, OF SPRINGFIELD, MISSOURI.

AUTOMOBILE-LOCK.

1,350,316.　　　　　Specification of Letters Patent.　　Patented Aug. 24, 1920.

Application filed August 19, 1919. Serial No. 318,440.

*To all whom it may concern:*

Be it known that I, AUGUST W. KEMMLING, a citizen of the United States of America, and resident of Springfield, in the county of Greene and State of Missouri, have invented certain new and useful Improvements in Automobile-Locks, of which the following is a specification.

This invention relates to locks for gear shifting levers of automobiles and has for its object a provision of novel means whereby gear shifting means of different types may be secured by a device of the same character, thus making it possible to manufacture the locks and dispose of them to users of different types of automobiles.

It has been difficult to acquire a lock except for certain well-known makes of automobiles and it is an object of this invention to produce a lock which may be used universally.

A further object of this invention is to provide a lock for an automobile shifting gear or lever which will readily disengage itself to permit free movement of said lever and which will not interfere with the free movement of said lever when said locking means is in its operative position.

A still further object of the invention is to provide a locking means of the character indicated which can be readily brought into operative position and secured against movement, the same proving of unusual strength and durability.

In describing the invention in detail reference will be had to the accompanying drawing forming a part of the specification wherein like characters denote corresponding parts in the several views in which drawing, Figure 1 is a view in perspective of the locking device embodying the invention applied to a shifting lever.

Fig. 2 is a plan view of a fragment of the locking device on a large scale.

Fig. 3 is a sectional view on the line 3/3 of Fig. 2, and,

Fig. 4 is a sectional view on the line 4/4 of Fig. 2.

In these drawings 5 denotes a bracket having a base 6 which may be secured to the floor of an automobile by fastenings 7 such as screws or bolts. The bracket 5 is U-shaped in plan and its side walls constitute a housing for the ends of the bars 8 and 9, each of which bars is oscillatably mounted on the pivot 10 and the pivot extends through the sides of the bracket.

The bar 8 is preferably straight and the end remote from the pivot has an aperture to receive a shackle of a lock to be presently explained.

The bar 9 has an offset 12 at a point between its ends to form a clearance for the reception of a yoke 13, the said yoke being curved to embrace a shifting lever 14. The yoke 13 has a stem 15 which projects through the bar 9, the said stem being upset to engage an offset portion 12 of the bar.

The bar 8 has a plate 17 secured to it and the said plate is bent to partially embrace the bar 9 and this plate is preferably stationed near the offset portion of the bar 9 and it is intended to hold the bars 8 and 9 from separation or from being pried apart. The end of the bar 9 remote from the pivot 10 has an aperture 17′ intended to receive a shackle of a lock 18.

A standard 19 has an aperture in its upper end with which the aperture 17′ in the bar 9 and the aperture 11 in the bar 8 aline so that the shackle of the lock will extend through all of the apertures and serve to connect the bars to the standard. As both ends of the bars are held rigidly and as the yoke 13 is adjustable so that it will bear against the shifting lever it is obvious that the said shifting lever will be held against movement and it will be impossible for unauthorized persons to manipulate the shifting lever and the locking device is installed in inoperative position.

The device can be constructed practically from stock material so that the cost of production will be comparatively small and the device has been found highly efficient in use.

I claim:—

In a locking device for shifting levers of automobiles, a bracket, bars hinged together on the bracket and normally having independent movement with respect to each other, one of the bars being offset to receive a shifting lever, a yoke attached to the bar within the offset portion to engage the said lever, a plate on the other bar shaped to embrace the companion bar to prevent spreading of the bars and means for locking the ends of the bars together.

AUGUST W. KEMMLING.